(12) United States Patent
Lin et al.

(10) Patent No.: US 10,352,698 B2
(45) Date of Patent: Jul. 16, 2019

(54) COMPOSITE HYDROLOGICAL MONITORING SYSTEM FOR DETECTING SCOUR DEPTH, WATER LEVEL AND FLOW VELOCITY

(71) Applicant: National Applied Research Laboratories, Taipei (TW)

(72) Inventors: Yung-Bin Lin, Taipei (TW); Yu-Chieh Chen, Taipei (TW); Tai-Shan Liao, Taipei (TW); Kuo-Chun Chang, Taipei (TW); Bo-Han Lee, Taipei (TW); Yung-Kang Wang, Taipei (TW); Meng-Huang Gu, Taipei (TW)

(73) Assignee: National Applied Research Laboratories, Taipei (TW)

( * ) Notice: Subject to any disclaimer, the term of this patent is extended or adjusted under 35 U.S.C. 154(b) by 313 days.

(21) Appl. No.: 15/383,456

(22) Filed: Dec. 19, 2016

(65) Prior Publication Data

US 2017/0292839 A1    Oct. 12, 2017

(30) Foreign Application Priority Data

Apr. 11, 2016    (TW) .............................. 105111172 A

(51) Int. Cl.
*G01C 13/00* (2006.01)
*G01F 1/05* (2006.01)
(Continued)

(52) U.S. Cl.
CPC .............. *G01C 13/008* (2013.01); *E02B 3/00* (2013.01); *G01F 1/05* (2013.01); *G01F 23/0007* (2013.01);
(Continued)

(58) Field of Classification Search
CPC ........... G01C 13/008; G01C 5/00; F02B 3/00; G01F 1/05; G01F 23/007; G01F 23/0023;
(Continued)

(56) References Cited

U.S. PATENT DOCUMENTS

2009/0293605 A1* 12/2009 Evrard .................. E21B 49/005
73/152.25
2014/0079248 A1* 3/2014 Short .................. G10L 21/0272
381/119

FOREIGN PATENT DOCUMENTS

KR    10-2001-0116815    10/2001
TW        430062         4/2001
(Continued)

OTHER PUBLICATIONS

Chinese National Intellectual Property Administration, Office Action, dated Mar. 4, 2019, 7 pages.

*Primary Examiner* — Harshad R Patel
*Assistant Examiner* — Nigel H Plumb
(74) *Attorney, Agent, or Firm* — Muncy, Geissler, Olds & Lowe, P.C.

(57) ABSTRACT

Disclosed is a composite hydrological monitoring system, in which a counterweight component and a test component are respectively connected to both opposite ends of a strip and a plurality of sensors are disposed at different vertical positions. Accordingly, the scour depth can be measured by sensing the location of the counterweight component, whereas the water level and/or flow velocity can be determined by signals from the sensors. When the counterweight component moves downward with sinking of the riverbed, the strip would be pulled down and thus causes the test component to present a change in mechanical energy. Accordingly, the sinking depth can be measured by sensing the change of the mechanical energy. Additionally, since the water level variation would cause signal changes of the sensors arranged in a row along a vertical direction, the change of water level can be determined accordingly.

25 Claims, 11 Drawing Sheets

(51) Int. Cl.
*G01F 23/30* (2006.01)
*E02B 3/00* (2006.01)
*G01F 23/00* (2006.01)
*G08B 21/00* (2006.01)
G01F 23/64 (2006.01)
G01F 1/00 (2006.01)

(52) U.S. Cl.
CPC ...... *G01F 23/0023* (2013.01); *G01F 23/0061* (2013.01); *G01F 23/30* (2013.01); *G08B 21/00* (2013.01); *G01F 1/005* (2013.01); *G01F 23/64* (2013.01)

(58) Field of Classification Search
CPC ...... G01F 23/0061; G01F 23/30; G01F 23/64; G01F 23/00; G01F 1/005; G08B 21/00; E02B 3/02; G01N 33/49; E21B 49/10
See application file for complete search history.

(56) References Cited

FOREIGN PATENT DOCUMENTS

| | | |
|---|---|---|
| TW | M282150 | 12/2005 |
| TW | M423827 | 3/2012 |
| TW | 201447071 | 12/2014 |

\* cited by examiner

COMPOSITE HYDROLOGICAL MONITORING SYSTEM FOR DETECTING SCOUR DEPTH, WATER LEVEL AND FLOW VELOCITY

CROSS REFERENCE TO RELATED APPLICATION

This application claims the benefits of the Taiwan Patent Application Serial Number 105111172, filed on Apr. 11, 2016, the subject matter of which is incorporated herein by reference.

BACKGROUND OF THE INVENTION

1. Field of the Invention

The present invention relates to a composite hydrological monitoring system. More specifically, the present invention relates to a composite hydrological monitoring system that measures the scour depth and the water level and/or the flow velocity.

2. Description of Related Art

The conventional method for detecting the scour depth and the water level is operated by manual inspection. However, the precision of the manual inspection rely on the experience of the inspectors, and the inspection operated on water also threatens the lives of the inspectors.

In recent years, many techniques for monitoring the scouring condition and water level have been developed. For example, the time-domain reflection method may monitor the water level, scour depth, or other physical parameters with different designs of the waveguide. The method of combining the designed waveguide similar to an anchoring cable was suggested for solving the problems of installation practice and signal attenuation. However, it still has the disadvantages of complex structure and economical high cost. Furthermore, a system for monitoring the scour depth of the riverbed, the flow velocity, and the sediment concentration has also been developed. The system comprises a plurality of sensing balls, a relay device, and an analysis device, wherein each of the sensing balls corresponds to different depths of the mud layer. When the sensing balls were scoured and floated, the built-in accelerometer, water pressure gauge, and positioning element may detect the moving acceleration, depth, and position of the sensing balls for analyzing the scour depth, water depth, position, and the flow velocity distribution in depth direction. However, this system has the problems of the complex circuit structure, difficult construction, economical high cost, and low survival hour.

Therefore, it is desirable to develop an improved composite hydrological monitoring system which has a simple structure, low cost, easy construction, and high survival hour to immediately monitor the scour depth caused by the flood, and the flow velocity and the water level of the flood.

SUMMARY OF THE INVENTION

It is one object of the present invention to provide a composite hydrological monitoring system for monitoring scour depth, water level, flow velocity, or the like. The composite hydrological monitoring system is advantageous of simple structure, low cost, easy construction, and long lifetime, which is beneficial to immediately control the flood safety and ensure the safety of river and marine constructs.

To achieve the object, the present invention provides a composite hydrological monitoring system, which comprises: a first hollow base body including a first accommodating space, wherein a plurality of first through holes is disposed on a sidewall of the first hollow base body and interconnects to the first accommodating space; a second hollow base body being disposed in the first accommodating space wherein a plurality of second through holes is disposed on a sidewall of the second hollow base body and interconnects the first accommodating space and the second accommodating space; a counterweight component being housed in the second accommodating space of the second hollow base body, wherein the counterweight component is capable of moving in a vertical direction under gravity; a test component being capable of moving in the vertical direction along with the counterweight component and present a change in mechanical energy; a strip connecting with the counterweight component and the test component, the test component is driven by the strip to present the change in mechanical energy when the counterweight component moves upwards in the vertical direction; a first sensor detecting the change in mechanical energy to generate a first signal; a float being movably sleeved on the strip; a second sensor including a plurality of sensing elements, which are disposed at a predetermined interval from one another in the vertical direction, wherein the float triggers the sensing elements at a corresponding position and drive the second sensor to generate a second signal; and a signal processing unit receiving the first signal and the second signal, wherein the signal processing unit converts the first signal into a scour depth and converts the second signal into at least one of a water level and a flow velocity.

In addition, the present invention provides another composite hydrological monitoring system, which comprises: a first hollow base body including a first accommodating space and a plurality of first through holes is disposed on a sidewall of the first hollow base body and interconnects to the first accommodating space; a counterweight component being housed in the first accommodating space, wherein the counterweight component is capable of moving in a vertical direction under gravity; a test component being capable of moving in the vertical direction along with the counterweight component and presenting a change in mechanical energy; a strip connecting with the counterweight component and the test component, wherein the test component is driven by the strip to present the change in mechanical energy when the counterweight component moves upwards in the vertical direction; a first sensor detecting the change in mechanical energy to generate a first signal; a second sensor including a plurality of sensing elements, which are disposed at a predetermined interval from one another in the vertical direction, wherein those sensing elements detect an environmental condition of the corresponding position to generate a second signal; and a signal processing unit receiving the first signal and the second signal, wherein the signal processing unit receiving converts the first signal into scour depth and converts the second signal into at least one of a water level and a flow velocity.

Accordingly, the composite hydrological monitoring system may be utilized for monitoring the scour depth and the water level/the flow velocity to ensure the flood control and safety of the river and marine constructs (such as piers, dikes, oil drilling platforms, offshore wind power generation facilities). For example, the first and the second hollow base body may be inserted straightly into the riverbed, and water or muds may get into the inner space of the first and the second base body through the first and second through holes on the sidewalls thereof, therefore, when the water scours the riverbed, the counterweight component may sink under gravity due to the sinking of riverbed that caused by the scouring and undercutting, the strip will be pulled down and thus cause the test component to present a change in mechanical energy due to the tensile strength of the strip. Accordingly, the change in mechanical energy may be detected by the first sensor; the vertical position of the counterweight component may be determined by the moving length of the strip. Therefore, the scour depth of the riverbed may be determined. Simultaneously, the float will float on the water surface due to buoyancy force, therefore, the float will move upwardly and vertically along with the change of water level, and the float will trigger the sensing element of the second sensor which is disposed at the corresponding position. Accordingly, the second sensor may detect the vertical position of the float and learn the water level. Additionally, the vibration of the float caused by the turbulence might trigger and drive the sensing element to generate a signal change, so that the flow velocity of the river may be obtained according to the level of the irregular signal change. Alternatively, the sensing elements disposed at different levels may directly detect the hydrological parameters (such as temperature, pressure, flow velocity, and the like) of the corresponding positions, and the water level or the flow velocity may be further obtained.

In the present invention, the composite hydrological monitoring system further comprises a third sensor, which is disposed at the counterweight component for detecting a movement of the counterweight component and generate a third signal, wherein the signal processing unit converts the third signal into a reference value which relates to at least one of the scour depth, the water level, and the flow velocity.

In the present invention, the float is not particularly limited, as long as the float may trigger the sensing element of the corresponding position. For example, if the sensing element triggers the sensing element by magnetic principle, a magnetic element may be disposed on the sidewall of the float. However, the sensing element of the present invention is not limited to be triggered by magnetic principle.

In the present invention, the test component is not particularly limited as long as the test component may move in the vertical direction along with the counterweight component and present a change in mechanical energy. For example, the position of the counterweight component may be detected due to the rotation change of the test component, that is, the test component may rotate with respect to a central axis and the strip surrounds the test component along the central axis. When the counterweight moves downwardly, the strip is elongated by the tensile strength of the counterweight component and drives the test component to rotate. In addition, to avoid the length of the strip becomes longer than a moving amount of the counterweight component, which moves downwardly, the test component may rotate reversely by a retrieving elastic force. For example, the test component may include a shell body, a mechanical turntable, a volute spring, and a three-jaw introversion mechanical coupling assembly, wherein the mechanical turntable is sleeved to an axis of the shell body, the volute spring surrounds the axis and is disposed at an inner wall of the mechanical turntable, the strip surrounds an outer wall of the mechanical turntable, and the three-jaw introversion mechanical coupling assembly connects to the mechanical turntable and the first sensor. The three-jaw introversion mechanical coupling assembly fastens the first sensor to the mechanical turntable so that it can be disassembled and assembled easily. Accordingly, the volute spring may provide the retrieving elastic force to reverse the rotation of the mechanical turntable when the length of the strip becomes longer than the moving amount of the counterweight component, so that the strip will rewind to a tension state and make sure that the length of the strip equals to the moving amount of the counterweight component. Therefore, the vertical position of the counterweight component may be detected precisely.

In the present invention, the first sensor is not particularly limited as long as the first sensor may detect the change in mechanical energy of the test component. For example, the first sensor may be a rotary encoder when the mechanical energy of the test component is rotational energy. Also, the rotary encoder may rotate synchronously with the test component to detect the rotating condition of the test component. For example, the rotary encoder utilized in an embodiment of the present invention is an optical encoder, which comprises a coding turntable, a light-emitting element, and a light-receiving element. The coding turntable connects to and rotates synchronously with the test component; the light-emitting element and the light-receiving element are respectively disposed at the opposite sides of the coding turntable. Accordingly, the coding turntable has one or plurality of black and white coding channels, therefore, when the coding turntable rotates synchronously with the mechanical turntable, the light emitted from the light-emitting element may generate the "opaque" and "translucent" states due to the coding channel. The light-receiving element receives the "opaque" and "translucent" states and generates rotational pulse signals as the first signal and output the number of rotational pulses to the signal processing unit, the signal processing unit then counts the pulse signal to learn the rotation condition of the mechanical turntable. For example, in one embodiment of the present invention, the first sensor may generate a first signal comprising phase A pulse signal, phase B pulse signal, and phase Z pulse signal, so that the rotation angle and the rotation direction (forward or reverse rotation) may be obtained.

In the present invention, the second sensor includes a plurality of sensing elements disposed at different vertical positions for multipoint detection, wherein the sensing elements may be disposed between the first hollow base body and the second hollow base body for detecting the condition of the float, or may be disposed at the strip for detecting the hydrological parameters of the corresponding positions. For example, in one embodiment of the present invention, a magnetic element having high magnetic permeability may be disposed on a sidewall of the float to trigger the sensing elements by magnetic induction so that the sensing elements may generate the second signal. Accordingly, the float may move upwardly and vertically along the strip due to buoyancy force when the water level changes. At the meantime, the sensing element which is triggered by the float may be determined by the second signal for confirming the position of the float after moving and then to obtain the water level. For example, those sensing elements are disposed symmetrically at least two opposite outer sidewall of the second hollow base body to form a plurality of sensing parts, wherein each of the sensing parts includes sensing elements that arranged in a row along vertical direction to generate the magnetic induction with the high permeability magnetic sensing elements on the sidewall of the float. In this case, those sensing elements may be magnetic switches and each sensing element of the sensing part may be connected in parallel to two wires. When the float moves to a position that corresponds to the magnetic switch, the high permeability magnetic element may induce the magnetic switch to be closed; thereby the wire is conducted at the corresponding position and to form a conducting loop. Due to the different resistance values of the wire conducted at different positions, the position of the float may be determined by the voltage signal measured at two ends of the conducting loop. In this case, the second sensing element generates the second signal preferably by Kelvin measurement for accurate measurement of the voltage value. Alternatively, those sensing elements may produce inductance changes induced by the high permeability magnetic element with the conductive coils, that is, each of the sensing elements may include an inductive coil that surrounds the second hollow base body. The magnetic element of the float will affect the inductive coil and generate the second signal when the float passes through the inductive coil. Accordingly, the position of the float may be determined by the electric or magnetic changes (such as inductance, electromotive force, magnetic force, or the like) caused by the float when passes through one of the inductive coils, thereby, the water level may be obtained. For example, the second sensor may further include a plurality of inductance solver digital module for detecting the inductance change of the inductance coil. Similarly, the vibration of the float caused by the turbulence may result in the electric or/and magnetic changes, so that the flow velocity of the river may be obtained according to the electric or/and magnetic change. In addition, in another embodiment of the present invention, the sensing elements are disposed at different vertical levels of the strip for detecting the physical parameters of the corresponding positions (such as temperature, pressure, flow velocity, or the like). The water level may be obtained by determining which sensing element locate on the water surface according to the different physical parameters in the water or beyond the water surface, or even to the different temperature, water pressure, flow velocity or the like of various depths in the water.

In the present invention, the signal processing unit may process and convert the received first signal and second signal for obtaining the scouring information (such as scour depth) according to the vertical position of the counterweight component. Simultaneously, the information of water flow (such as water level, flow velocity, or the like) may be obtained according to the vertical movement or/and vibration of the float caused by the water flow, or to the hydrological parameters of different vertical positions (such as water lever, flow velocity, or the like). Herein, the magnetic switch may be utilized as the sensing element for detecting the float in the present invention; therefore the signal processing unit may include a decoding module, a first conversion module, a signal amplification module, a second conversion module, and an analysis module. Alternatively, the inductive coil may be utilized as the sensing element for detecting the float in the present invention; therefore the signal processing unit may include a decoding module, a first conversion module, a solver transfer module, a second conversion module, and an analysis module. The decoding module receives the first signal and then the first signal is processed into a decoding signal; the first conversion module receives the decoding signal and the decoding signal is processed into the scour depth value; the signal amplification module/solver transfer module receives the second signal and the second signal is processed into an amplification signal/solver signal; the second conversion module receives the amplification signal/solver signal and the amplification signal/solver signal is processed into at least one of the flow velocity value and the water level; and the analysis module may analyze the scour depth value and the water level to propose the warning signals. In this case, the decoding module may read the pulse signal outputted by the first sensor and count and decode the pulse signal through the AB phase decoding circuit. The first conversion module may convert the decoded signal into the scour depth via the pulse conversion circuit. The signal amplification module may filter out noise through the lock-in amplification technology to obtain an accurate voltage value. The solver transfer module adopts the time-division multiple access (TDMA) for making the solver digital module in the second sensor can share the transmission media and return the data to the solver transfer module within the specified time to decide which of the inductive coil produce the inductance value change. The second conversion module may convert the line resistance into the position or obtain the water level from the inductance change of one of the inductive coil. The flow velocity may be obtained due to frequent changes of the line resistance or the inductance of the inductive coil. The analysis module reads the data of the scour depth and the water level for making a comprehensive analysis; then raising the warning signal based on the following situation: (1) when the scour depth is larger than a first alert threshold, the analysis module will raise the warning signal, on the contrary, when the scour depth is smaller than the first alert threshold, the analysis module will not raise the warning signal; (2) when the water level is large than a second alert threshold, the analysis module will raise the warning signal, on the contrary, when the water level is smaller than the second alert threshold, the analysis module will not raise the warning signal; and (3) when the scour depth is smaller than the first alert threshold and the water level is smaller than the second alert threshold but a total value of the scour depth and the water level is larger than a third alert threshold, the analysis module will raise the warning signal, on the contrary, when the scour depth is smaller than the first alert threshold, the water level is smaller than the second alert threshold, and the total value of the scour depth and the water level is also smaller than the third alert threshold, the analysis module will not raise the warning signal, wherein the first alert threshold, the second alert threshold, and the third alert threshold are a set parameter respectively.

In the present invention, the signal processing unit may transmit the data of the scour depth, water level, flow velocity, and warning signal to a receiving end through the wireless or wired transmission. In more detail, the signal processing unit may further include a communication module for receiving the data of the scour depth, flow velocity, water level, and warning signal and transmitting the data of scour depth, flow velocity, water level, and warning signal to a receiving end. Herein, the communication module read the data of the scour depth, flow velocity, and water level in every predetermined time period, and when the warning signal is raised by the analysis module, the communication module may remind the management staff by text message, e-mail, voice message, or the like.

DETAILED DESCRIPTION OF THE PREFERRED EMBODIMENT

Hereafter, examples will be provided to illustrate the embodiments of the present invention. Advantages and effects of the invention will become more apparent from the disclosure of the present invention. It should be noted that these accompanying figures are simplified and illustrative. The quantity, shape and size of components shown in the figures may be modified according to practical conditions, and the arrangement of components may be more complex. Other various aspects also may be practiced or applied in the invention, and various modifications and variations can be made without departing from the spirit of the invention based on various concepts and applications.

Figure 1:
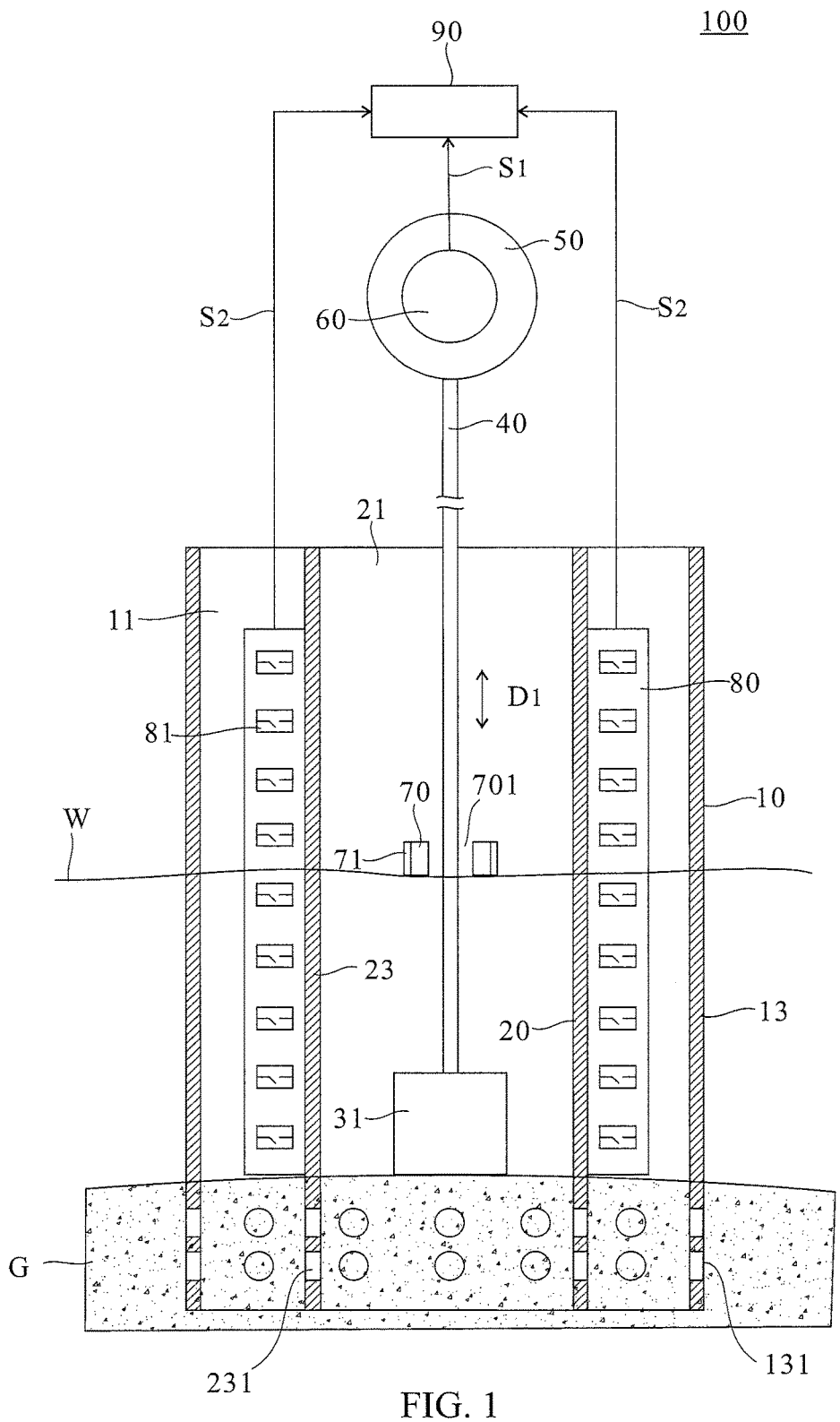
FIG. 1 is a schematic diagram of the composite hydrological monitoring system of one embodiment of the present invention.

Please refer to FIG. 1, which shows the composite hydrological monitoring system 100 of one embodiment of the present invention. As illustrated in FIG. 1, the composite hydrological monitoring system 100 of the present invention comprises a first hollow base body 10, a second hollow base body 20, a counterweight component 31, a strip 40, a test component 50, a first sensor 60, a float 70, a second sensor 80, and a signal processing unit 90. The first hollow base body 10 may be a hollow steel column, the interior thereof includes a first accommodating space 11, wherein a plurality of first through holes 131 is disposed on a sidewall 13 thereof and interconnects to the first accommodating space 11. The second hollow base body 20 may be a plastic column which is disposed in the first accommodating space 11, and the interior thereof includes a second accommodating space 21, wherein a plurality of second through holes is disposed on a sidewall 23 thereof and interconnects to the first accommodating space 11 and the second accommodating space 21. The counterweight component 31 may be a lead hammer which is housed in the second accommodating space 21 of the second hollow base body 20, wherein the counterweight component 31 is capable of moving in the vertical direction D1. The strip 40 may be a 30 meters long steel wire with opposite two ends connected with the counterweight component 31 and the test component 50 respectively. When the counterweight component 31 moves in the vertical direction D1 under gravity, the test component 50 may be driven by the strip 40 to present the change in mechanical energy and the first sensor 60 may detect the change in mechanical energy of the test component 50 to generate a first signal S1. The float 70 may be styrofoam with a hole 701 at the center thereof, and the magnet sheet and high permeability magnetic material are disposed on the sidewall of the float 70 as a magnetic element 71. The strip 40 passes through the hole 701 of the float 70 so that the float 70 covers and is movably sleeved to the strip 40. The float 70 may move toward the vertical direction D1 along the strip 40 under buoyant force, also, the float 70 may vibrate under the turbulence flow. The second sensor 80 includes a plurality of sensing elements 81 which are disposed at a predetermined interval from one another in the vertical direction D1 between the first hollow base body 10 and the second hollow base body 20 and are fixed on the outer sidewall of the second base body 20, wherein the float 70 in the second base body 20 triggers the sensing element 81 at a corresponding position through the magnetic element 71 and drive the second sensor 80 to generate a second signal S2. The signal processing unit 90 receives the first signal S1 and the second signal S2 and converts the first signal S1 and the second signal S2 into a scour depth and a water level and a flow velocity respectively.

Accordingly, the composite hydrological monitoring system 100 may be used to instantly detect the scour depth and the water level of the flood. When the flood scours the riverbed G, the counterweight component 31 sinks at the scouring place and pulls down the strip 40, the test component 50 is then driven to present a change in mechanical energy. The change in mechanical energy is then detected by the first sensor 60 to determine the vertical position of the counterweight component 31, accordingly, the scour depth of the riverbed may be obtained. Simultaneously, the float 70 floats on the water surface W, so that the vertical position of the float 70 changes when the water surface changes and the magnetic element 71 on the float 70 will trigger the sensing element 81 of the second sensor 80 at a corresponding position. Accordingly, the vertical position of the float 70 may be determined and the water level may be obtained. At the meantime, the flow velocity of the river may also be obtained according to the level of the irregular signal change.

The following description will describe the structure and function of each component of the composite hydrological monitoring system 100.

Figure 2:
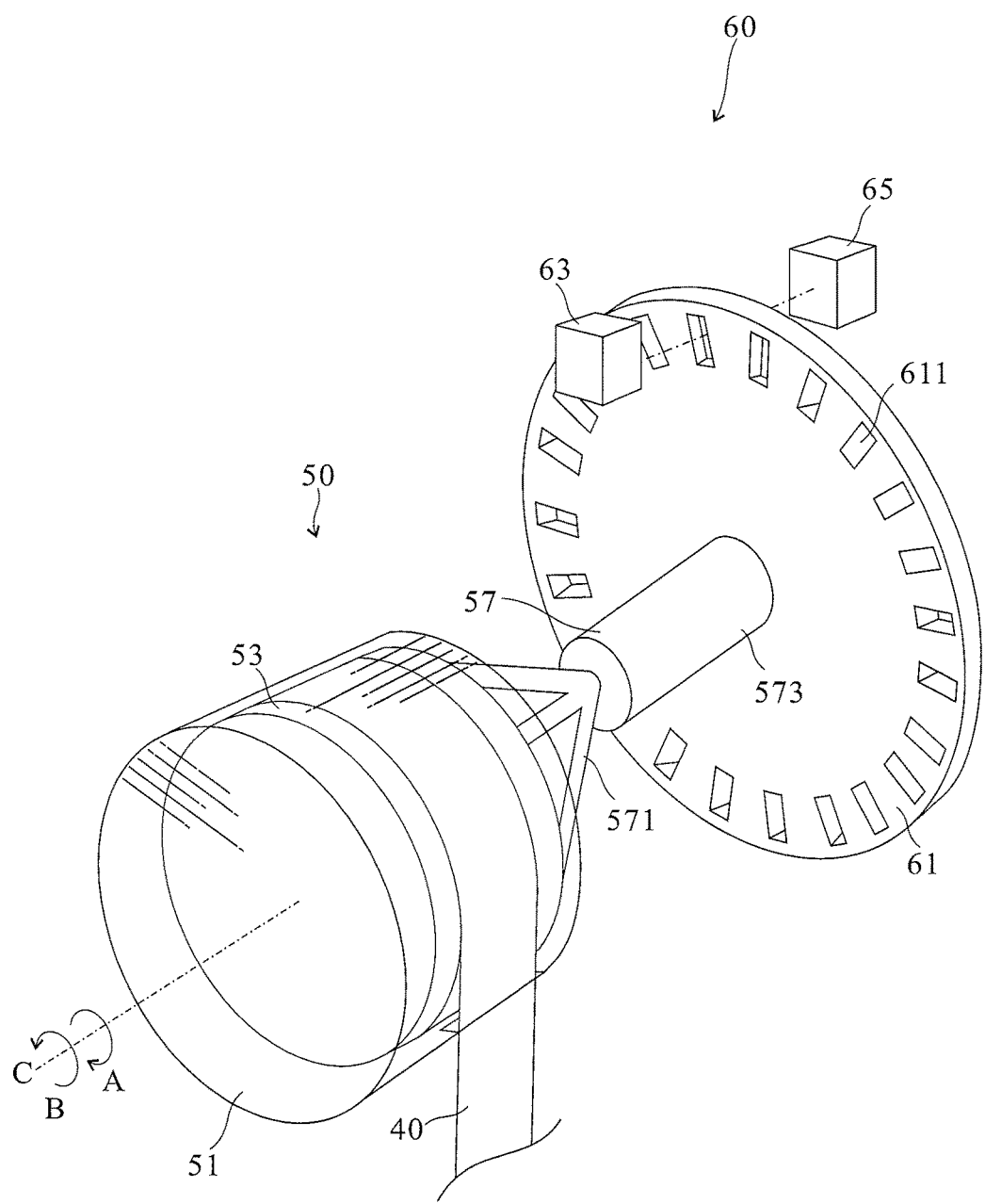
FIG. 2 is a schematic diagram of the test component and the first sensor of one embodiment of the present invention.
Figure 3:
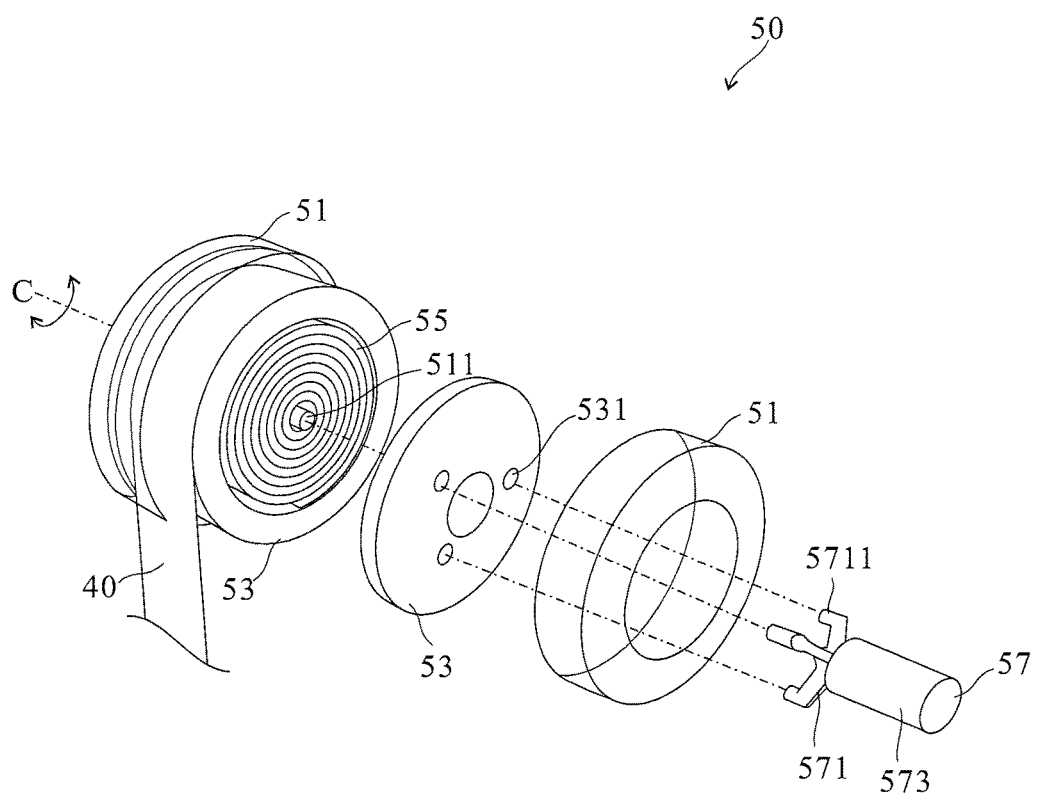
FIG. 3 is a decomposition diagram of the test component of one embodiment of the present invention.

Please refer to FIG. 2 and FIG. 3 for further description of the structure and function of the test component 50 and the first sensor 60. In the present embodiment, the rotary test component 50 and the first sensor 60 are exemplified. Referring the test component 50 and the first sensor 60 illustrated in FIG. 2, the test component 50 and the first sensor 60 shaft connect to each other, and the strip 40 surrounds the test component 50 with respect to a central axis C. When the test component 50 rotates with respect to axis C, the first sensor 60 rotates synchronously with the test component 50. Specifically, refer to the decomposition diagram of the test component 50 illustrated in FIG. 3, the test component 50 comprises a shell body 51, a mechanical turntable 53, a volute spring 55, and a three-jaw introversion mechanical coupling assembly 57. The interior of the shell body 51 has an axis 511, the mechanical turntable 53 is housed in the shell body 51 and is sleeved to the axis 511 of the shell body 51. The volute spring 55 is disposed at an inner wall of the mechanical turntable 53 and surrounds the axis 511 for forming a rewound system. The strip 40 surrounds the outer side of the mechanical turntable 53. One end of the three-jaw introversion mechanical coupling assembly 57 is connected to the via holes 531 of the mechanical turntable 53 by its three claws 571; another end of the three-jaw introversion mechanical coupling assembly 57 is connected to the first sensor 60 by a joint axle 573 (please refer to FIG. 2). In this case, as illustrated in FIG. 3, each of the claws 571 of the three-jaw introversion mechanical coupling assembly 57 has inward introverted end 5711, and the ends 5711 of the claws 571 may vertically insert into the via holes 531 of the mechanical turntable 53 for disassembling or assembling. Further, as illustrated in FIG. 2, the sensor 60 used in the present embodiment is a rotary encoder type of optical encoder. The optical encoder has a coding turntable 61, a light-emitting element 63, and a light-receiving element 65, wherein the coding turntable 61 connects with the three-jaw introversion mechanical coupling assembly 57 of the test component 50, and the light-emitting element 63 and the light-receiving element 65 are respectively disposed on the opposite sides of the coding turntable 61. A plurality of translucent slits 611 is disposed on the coding turntable 61, and two states of "opaque" and "translucent" represent the binary code "1" and "0" respectively. A "1" signal is generated when the light emitted from the light-emitting element 63 penetrates the translucent slits 611 and reaches the light-receiving element 65; on the contrary, a "0" signal is generated when the light emitted from the light-emitting element 63 fails to reach the corresponding translucent slits 611 and the light-receiving element 65 fails to receive the light. Accordingly, the rotation condition may be known by counting the signal 101010 . . . generated with respect to the light-receiving element 65.

In addition, a plurality of coding channels (one lap of black and white circles is called a coding channel, a simple example is illustrated as one lap of translucent slit in FIG. 2) may be disposed on the coding turntable 61 for generating a first signal comprising phase A pulse signal, phase B pulse signal, and phase Z pulse signal, wherein the retardation between phase A and phase B is 90°. The forward or reverse rotation of the coding turntable 61 may be detected by comparing which of phase A or phase B comes at first. Phase Z is generated by a third coding channel (Z), which is one translucent slit, as a zero reference position.

Accordingly, when the water scours the riverbed and causes the sinking of the riverbed, the counterweight component 31 (refer to FIG. 1) may sink along the riverbed under gravity. The strip 40 is pulled down by the counterweight component 31 and thus causing the mechanical turntable 53 of the test component 50 to rotate forwardly (shown by the arrow A). At the meantime, the coding turntable 61 of the first sensor 60 rotates forwardly and synchronously. To make sure that the elongated length of the strip 40 equals to the scour depth, the volute spring 55 (refer to FIG. 3) of the test component 50 provides a return elastic force. So that when the length of the strip 40 pulled down by the counterweight component 31 is larger than the scour depth, the mechanical turntable 53 may rotate reversely (shown by the arrow B) under the elastic force provided by the volute spring 55 and rewind the strip 40 back to its tight state, and the coding turntable 61 of the first sensor 60 may rotate reversely and synchronously. Finally, the moving length of the strip 40 may be determined by counting the phase A, phase B, and phase Z pulse signals.

Figure 4:
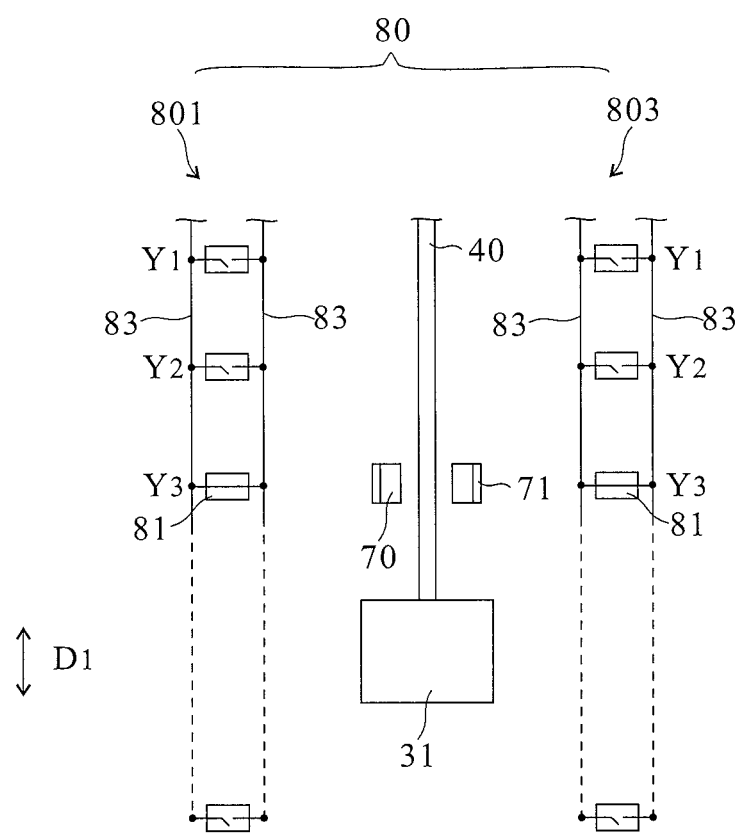
FIG. 4 is a schematic diagram of the second sensor which is used for detecting the float of one embodiment of the present invention.

Please refer to FIG. 4 for detail description between the float 70 and the second sensor 81. As illustrated in FIG. 4, the sensing elements 81 of the second sensor 80 are disposed symmetrically on the opposite inner sidewall of the first hollow base body (not shown) and the opposite outer sidewall of the second hollow base body (not shown) for forming a first sensing part 801 and a second sensing part 803. In this case, the magnetic switch is used as the sensing element 81 for exemplifying the first embodiment. Those sensing element 81 of the first sensing part 801 and the second sensing part 803 located at positions Y1, Y2, Y3 . . . are connected in parallel to two wires 83 and are arranged in a row along the vertical direction at a predetermined interval of 5 cm from one another. Accordingly, as illustrated in FIG. 4, when the float 70 is floating on the water surface that corresponds to the sensing element 81 at the vertical position Y3, the magnetic element 71 on the float 70 triggers the sensing element 81 at position Y so that the two wires 83 of the first sensing part 801 and the second sensing part 803 are connected to each other and form a conducting loop, and a voltage value of two ends of the conducting loop may be measured. Due to the different resistance values of the two wires 83 conducted at different positions, the voltage value will be different when the float 70 triggers the sensing element 81 located at different positions, therefore, the voltage value measured may be used as a basis to obtain the water level. Herein, Kelvin measurement is preferable for accurate measurement of the voltage value.

Figure 5:
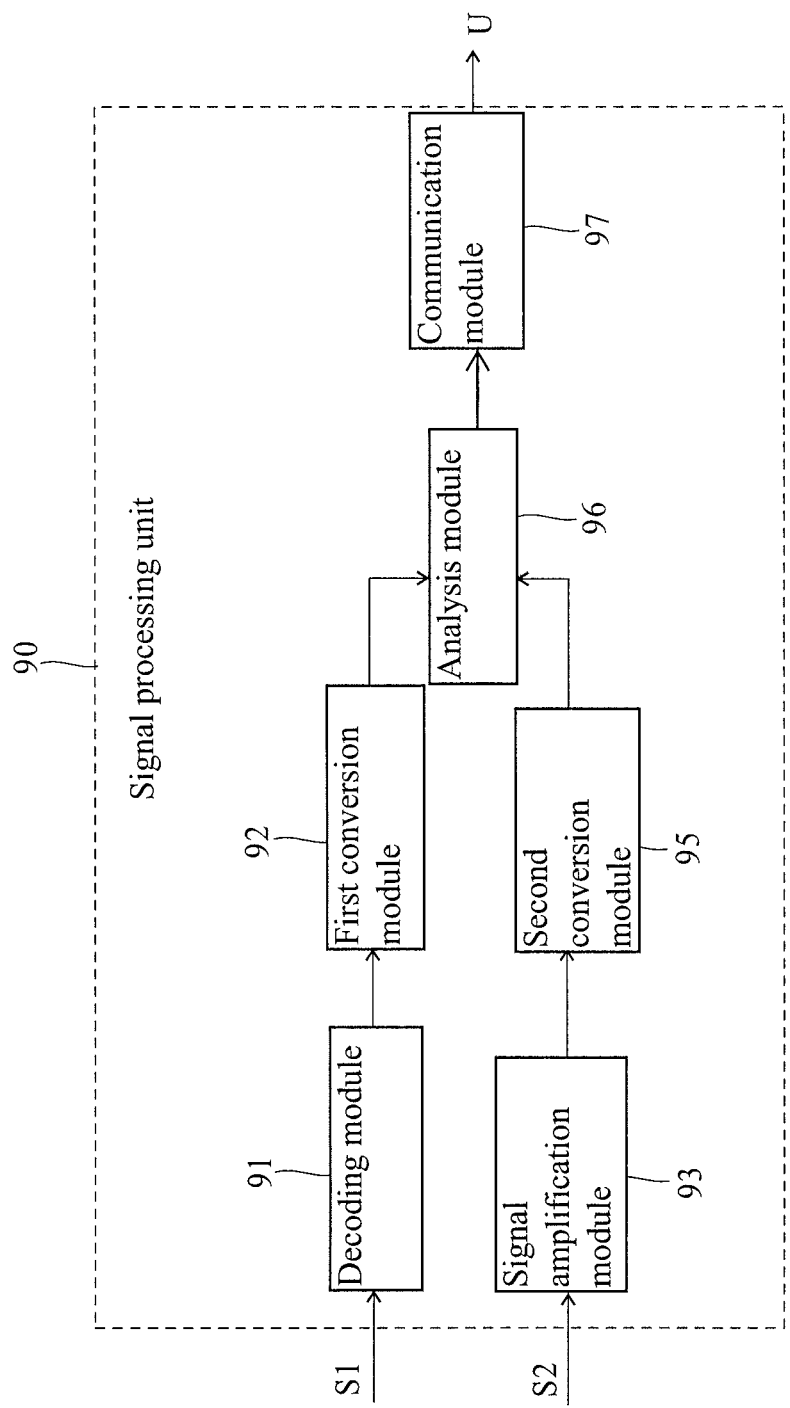
FIG. 5 is a block diagram of the signal processing unit of one embodiment of the present invention.

Next, please refer to the block diagram of the signal processing unit shown in FIG. 5, wherein the first signal S1 and the second signal S2 generated by the first sensor 60 and the second sensor 80 are transmitted to the signal processing unit 90 for analysis. As illustrated in FIG. 5, the signal processing unit 90 of the present embodiment includes a decoding module 91, a first conversion module 92, a signal amplification module 93, a second conversion module 95, an analysis module 96, and a communication module 97.

When the decoding module 91 receives the first signal S1, the first signal S1 may be processed into a decoded signal by the AB phase decoding circuit. Then, the first conversion module 92 may convert the decoded signal into the scour depth via the pulse conversion circuit. Additionally, the second signal S2 received by the signal amplification module 93 is processed into an amplification signal through the lock-in amplification technology. Specifically, as described above, the sensing elements 81 illustrated in FIG. 4 are disposed at an interval of 5 cm from one another; therefore, the resistance change due to the different position is small and may be easily interference by noise or drift. Accordingly, the lock-in amplification technology may filter out the noise to obtain an accurate voltage value. Then, the amplification signal is converted into the position based on the line resistance using the second conversion module 95 for obtaining the value of water level and flow velocity. Next, the analysis module reads the data of the scour depth and the water level for making a comprehensive analysis and for raising a warning signal. The analysis module 96 transmits the warning signal and the data of the scour depth, the water level, and the flow velocity to the communication module 97, the communication module 97 reads those data described above in every predetermined time and transmits those data and warning signal to the receiving end U. Accordingly, the receiving end U may display an X-axis and a Y-axis represent the scour depth and water level or flow velocity respectively. When the analysis module 96 raises the warning signal, the communication module 97 may remind the management staff by text message, e-mail, voice message, or the like.

The following description further describes the process of making the comprehensive analysis of the scour depth value X and the water level value Y with the analysis module 96.

Figure 6:
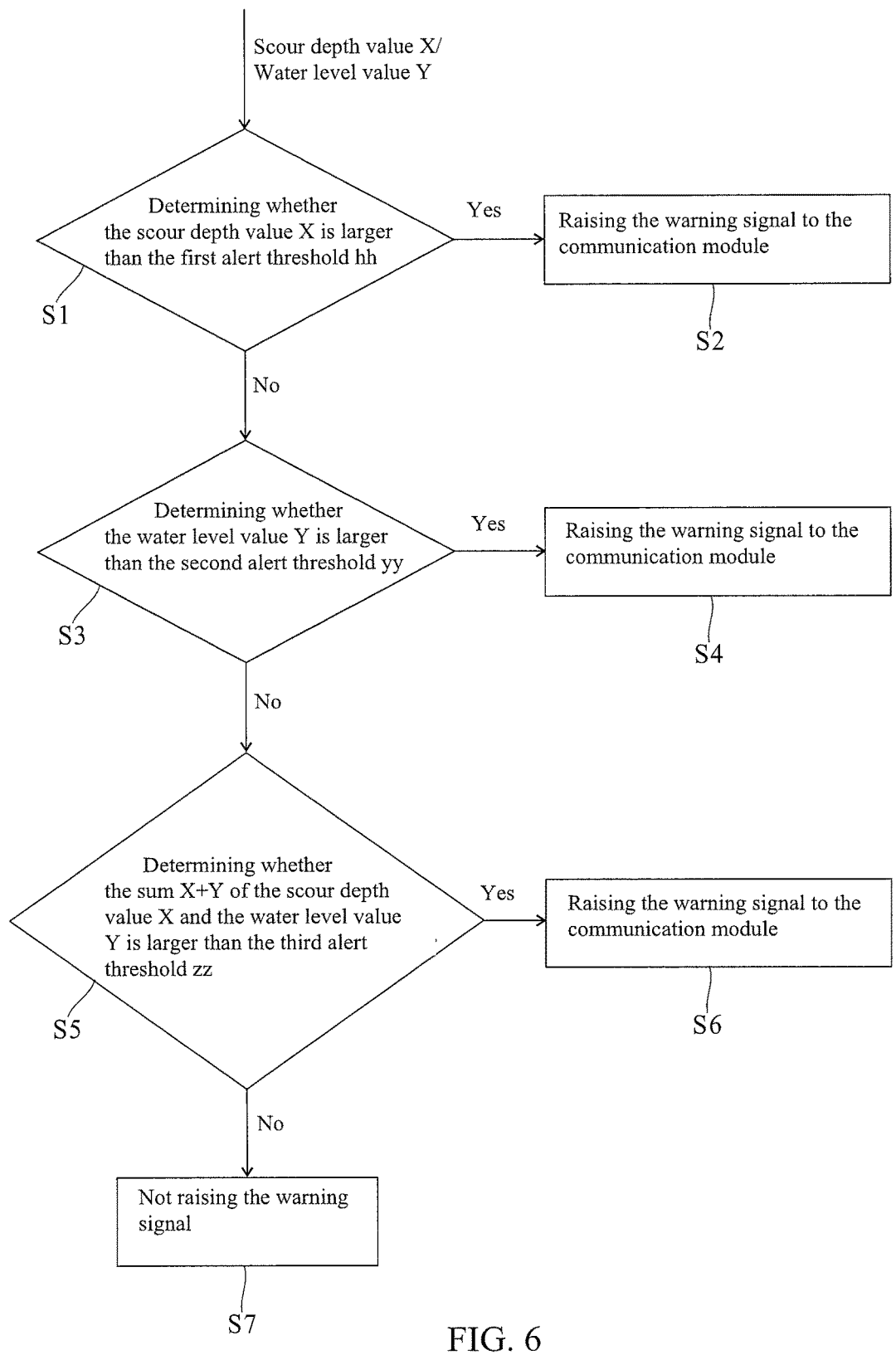
FIG. 6 is a flowchart of the analysis process of one embodiment of the present invention.

Please refer to FIG. 6, firstly, the analysis module 96 determines whether the scour depth value X is larger than the first alert threshold hh (step S1); when the scour depth value X is larger than the first alert threshold hh, the analysis module will raise the warning signal to the communication module 97 (step S2); when the scour depth value X is smaller than the first alert threshold hh, the analysis module 96 will determine whether the water level value Y is larger than the second alert threshold yy (step 3); when the water level value Y is larger than the second threshold yy, the analysis module 96 will raise the warning signal to the communication module 97 (step 4); when the water level value Y is smaller than the second threshold yy, the analysis module 96 will determined whether the sum X+Y of the scour depth value X and the water level value Y is larger than the third alert threshold zz (step 5); when the sum X+Y is larger than the third alert threshold zz, the analysis module 96 will raise the warning signal to the communication module 97 (step 6); and when the sum X+Y is smaller than the third alert threshold zz, the analysis module 96 will not raise the warning signal (step 7). The first alert threshold, the second alert threshold, and the third alert threshold (hh, yy, zz) may be setting parameters.

Figure 7:
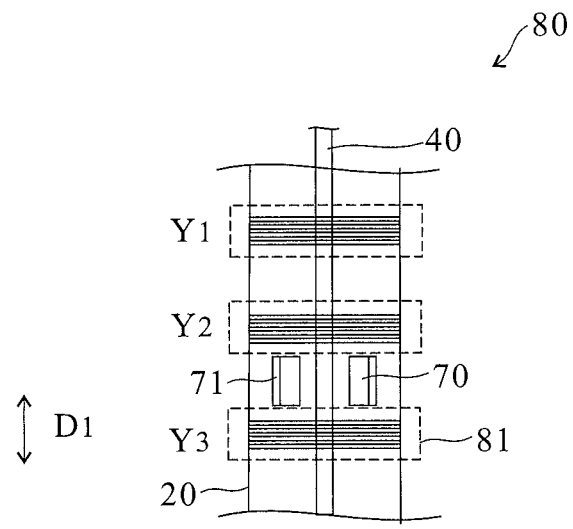
FIG. 7 is a schematic diagram of the second sensor of another embodiment of the present invention.
Figure 8:
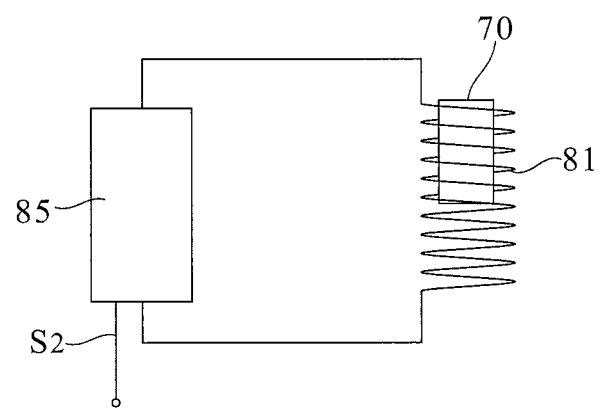
FIG. 8 is a schematic diagram of the sensing element which is used for detecting the float of another embodiment of the present invention.

In addition, another embodiment of the second sensor 80 is illustrated in FIG. 7. As illustrated in FIG. 7, the induced coil surrounds the positions Y1, Y2, Y3 . . . of the outer sidewall of the second hollow base body 20 as the sensing elements 81. When the float 70 passes vertically through the corresponding inductive coil along with the water surface, the magnetic element 71 having high magnetic permeability on the float 70 will affect the inductive coil and cause the electric or magnetic changes (such as inductance, electromotive force, magnetic force, or the like). Accordingly, the location of the float 70 may be determined by detecting the electric or magnetic changes of the inductive coil (such as inductance, electromotive force, magnetic force, or the like) when the float 70 passes through the inductive coil. Similarly, the vibration of the float 70 caused by the turbulence may result in electric or/and magnetic changes so that the flow velocity of the river may be obtained according to the electric or/and magnetic change. In addition, the second embodiment of the present invention is exemplified by detecting the inductance value change. Please refer to FIG. 8, each of the sensing elements 81 (the inductive coil) are equipped with an inductance solver digital module 85 for detection. As illustrated in FIG. 8, two ends of each of the sensing elements 81 (the inductive coil) are electrically connected to the inductance solver digital module 85. Therefore, the magnetic element 71 having high magnetic permeability of the float 70 will affect the inductive coil and generate a magnetic change when the float 70 passes through the inductive coil. The inductance value may be calculated by the inductance solver digital module 85, and the second signal S2 including the position of the inductive coil and the inductance value is transmitted.

Figure 9:
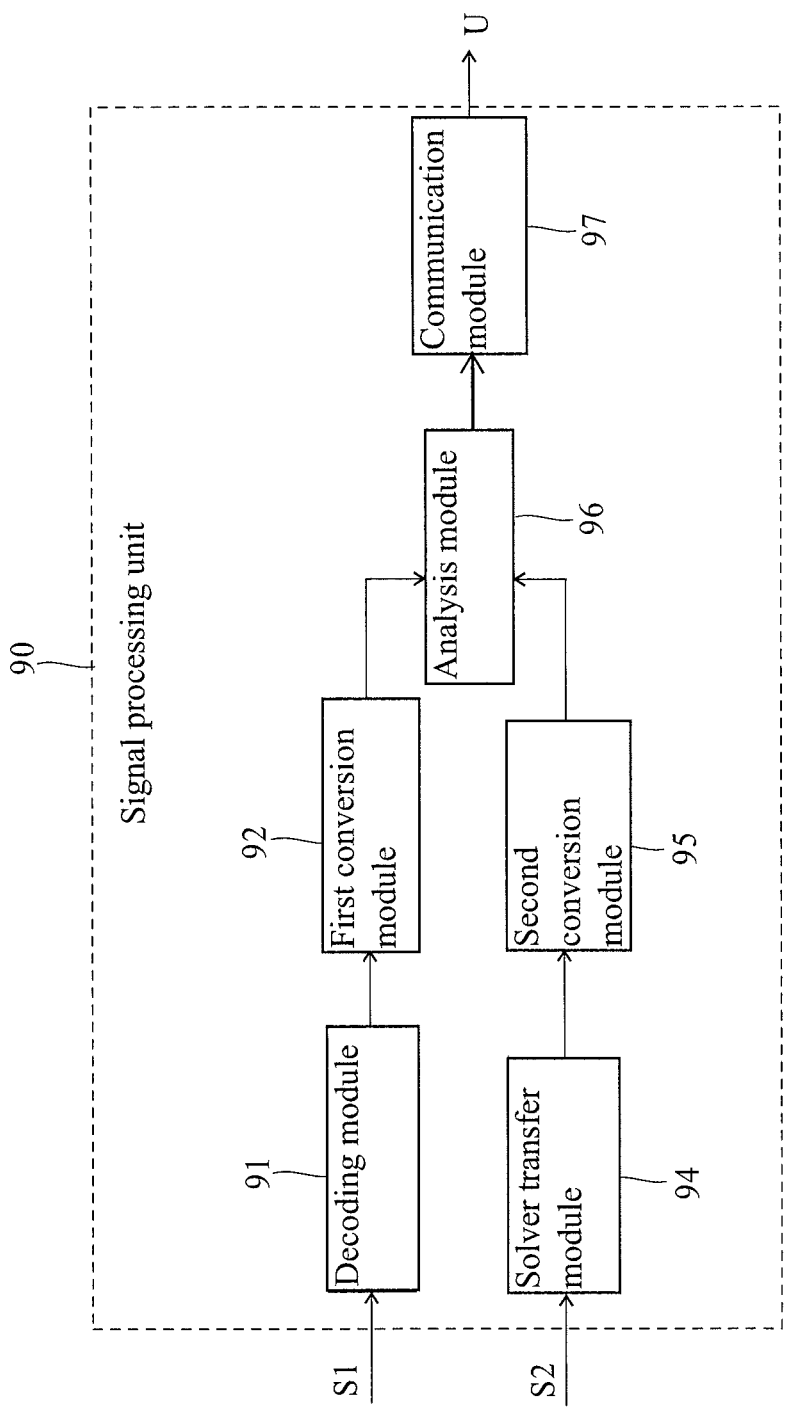
FIG. 9 is a block diagram of the processing unit of another embodiment of the present invention.

Next, please refer to the block diagram of the signal processing unit of the second embodiment shown in FIG. 9. As illustrated in FIG. 9, the signal processing unit 90 includes a decoding module 91, a first conversion module 92, a solver transfer module 94, a second conversion module 95, an analysis module 96, and a communication module 97. In this case, the processing steps for the first signal S1 is similar to those described in the first embodiment, therefore, the same description need not be repeated. The processing steps for the second signal S2 will be described in detail in the following description. As illustrated in FIG. 9, the solver transfer module 94 receives the second signal S2 and the second signal S2 is processed into a solver signal. The solver signal is then converted into the flow velocity value and the water level value by the second conversion module 95, afterward, the comprehensive analysis described in the first embodiment is made by the analysis module 96.

Figure 10:
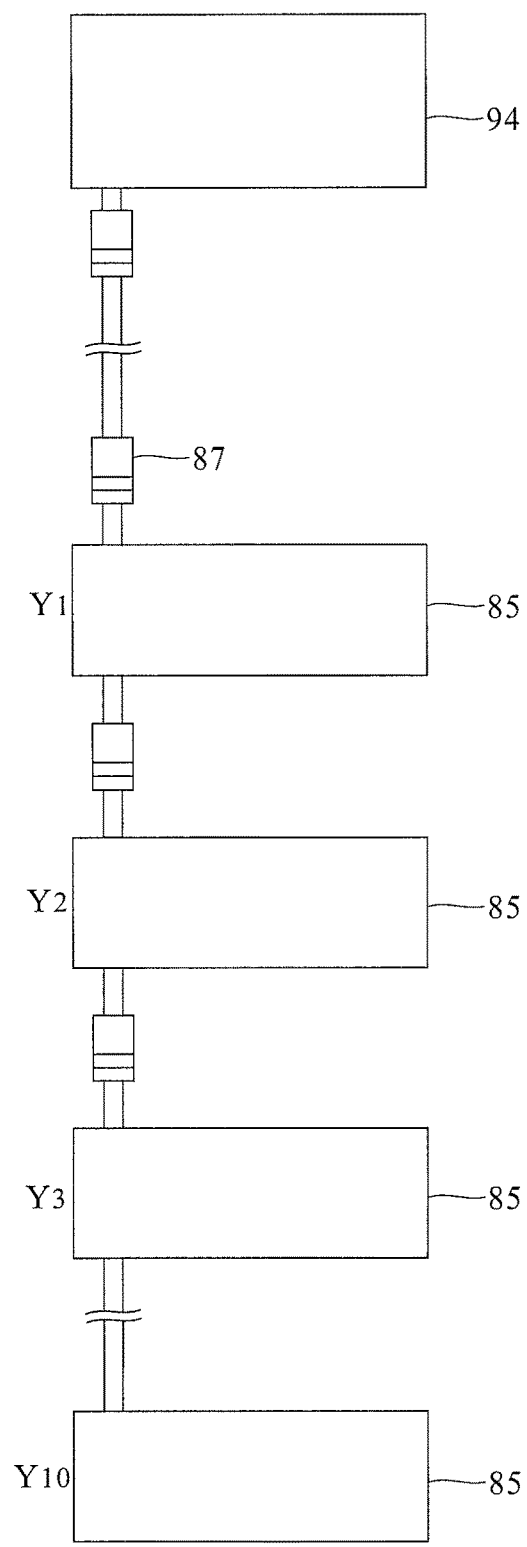
FIG. 10 is a connection schematic diagram of the inductance solver digital module and the solver transfer module of one embodiment of the present invention.

Please refer to FIG. 10, which illustrates the connection between the inductance solver digital module 85 and the solver transfer module 94. As illustrated in FIG. 10, the inductance change at the positions Y1, Y2, Y3, . . . in the vertical direction are detected by the plurality of inductance solver digital modules 85, wherein those inductance solver transfer module 85 are connected in serious with waterproof connectors 87 and then connected to the solver transfer module 94. Accordingly, those inductance solver digital modules 85 may share the transmission media, and return the data to solver transfer module 94 within the specified time through TDMA. The second signal S2 transmitted from the inductance solver digital module 85 includes the location ID and the inductance measured thereof, therefore, the solver transfer module 94 may determine which inductive coil generates the inductance change and the change value thereof according to the second signal S2. Further, the value of the water level and the flow velocity may be obtained by the second conversion module 95, similarly, the flow velocity may be based on the change condition of the detected inductance value.

Figure 11:
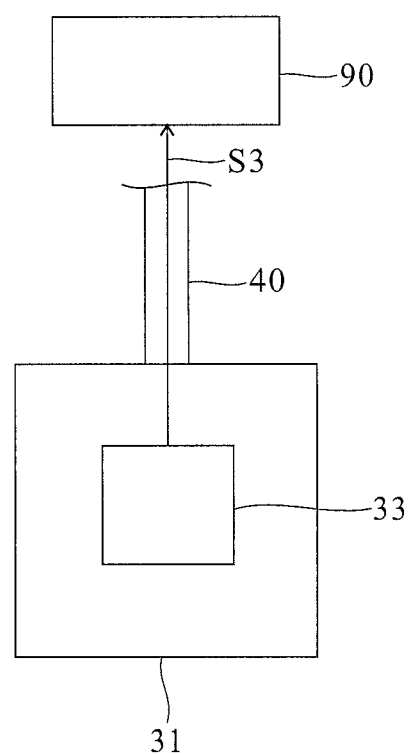
FIG. 11 is a schematic diagram of disposing the third sensing element in the counterweight component of another embodiment of the present invention.

In addition, please refer to FIG. 11, a third sensor 33 may further be disposed in the counterweight component 31, wherein the third sensor 33 may generate signal changes based on the movements of the counterweight component 31. The signal processing unit 90 may receive the third signal S3 generated by the third sensor 33, and convert the third signal S3 into reference values which relate to at least one of the scour depth, the water level, and the flow velocity. The reference values converted from the third signal S3 are compared with the scour depth value converted from the first signal S1 or/and the scour depth value converted from the second signal S2 to ensure the data accuracy. In this case, the third sensor 33 may be any device that is able to distinguish the movement and the moving condition of the counterweight component 31, for example, the third sensor 33 may be an accelerometer, an image sensor, a thermometer, or a gyroscope.

Figure 12:
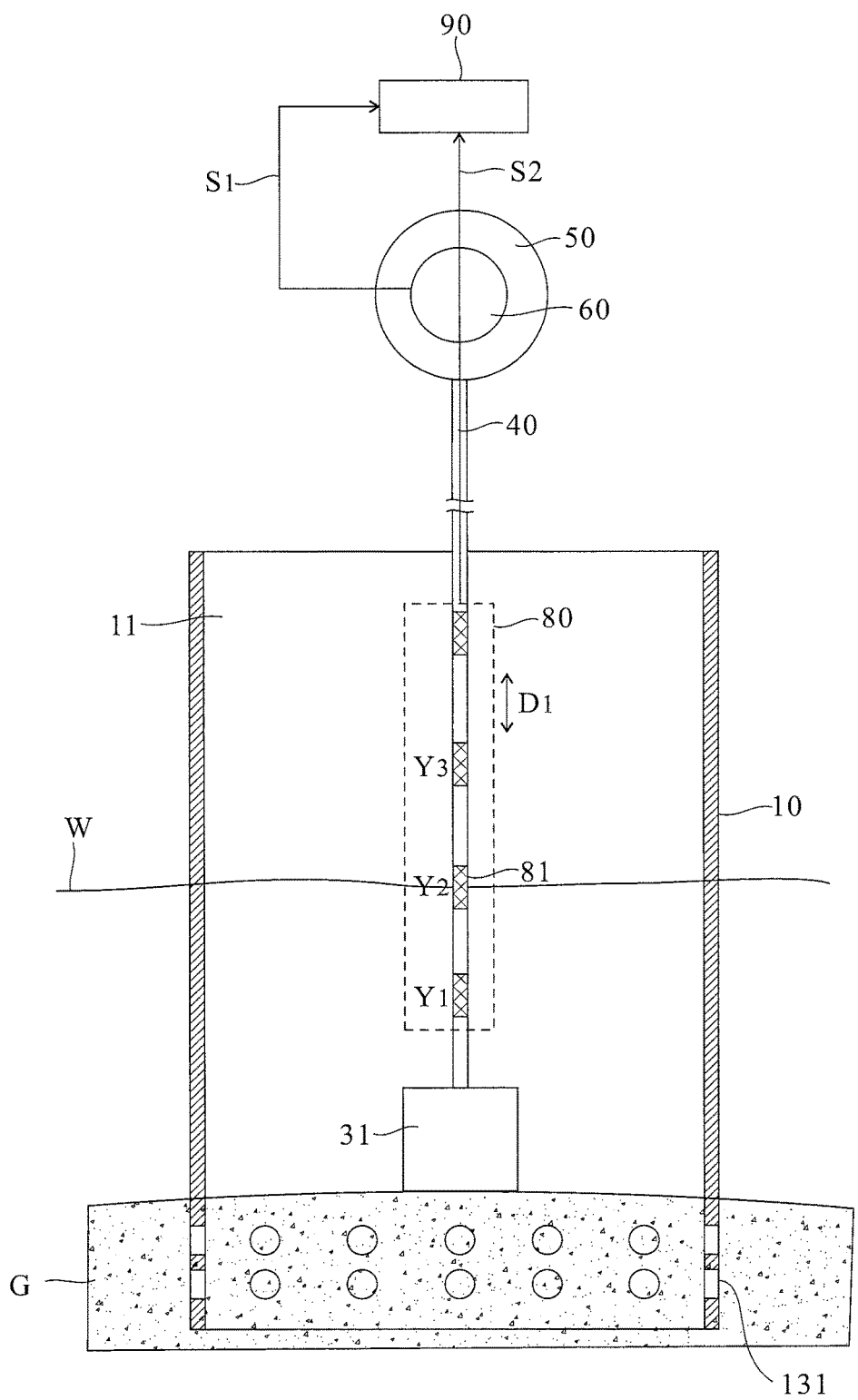
FIG. 12 is a schematic diagram of the composite hydrological monitoring system of another embodiment of the present invention.

Next, please refer to FIG. 12 illustrating a composite hydrological monitoring system 200 of another embodiment of the present invention. The composite hydrological detecting system 200 comprises a first hollow base body 10, a counterweight component 31, a strip 40, a test component 50, a first sensor 60, a second sensor 80, and a signal processing unit 90. As illustrated in FIG. 12, the configurations and the mechanisms of the first hollow base body 10, the counterweight component 31, the test component 50, and the first sensor 60 of the composite hydrological monitoring system 200 are similar to those illustrated in FIG. 1 to FIG. 3, except that the float is absence in the hydrological monitoring system 200 and the second sensor 80 disposed on the strip 40 is applied directly to detect the water level, the flow velocity, and the like. Specifically, the second sensor 80 comprises a plurality of sensing elements 81, which are disposed at a predetermined interval in the vertical direction on the positions Y1, Y2, Y3, . . . of the strip 40. The physical parameters (such as temperature, pressure, flow velocity, or the like) may be detected by the sensing elements 81 disposed at different vertical positions of the strip 40 because of the environmental conditions divers at different vertical positions of the strip 40. Accordingly, when the signal processing unit 90 receives the second signal S2 generated by the second sensor 80, the sensing element 81, which is located on the water surface W, can be determined based on the detected reference values so that the water level may be determined. For example, a thermometer or a pressure gauge may be used as the sensing elements 81 for detecting the temperature or the pressure at different vertical positions, and the water level may be determined based on the temperature of the pressure detected at those vertical positions. In addition, due to the different flow velocity at different depths under water, the flow velocities detected at different vertical positions of the strip 40 will be different, therefore, the flow velocities of different vertical positions may be detected by the sensing elements 81 and even the water level may be determined by the flow velocity distribution. Similarly, the composite hydrological monitoring system 200 may further comprise a third sensor 33 illustrated in FIG. 11. The third sensor 33 provides at least one reference value of the scour depth, flow velocity, and water level for comparing the scour depth value obtained from the first signal S1 or/and the water level/flow velocity value obtained from the second signal S2 once again.

In summary, the composite hydrological monitoring system of the present invention may detect the scour depth and water lever/flow velocity with the counterweight component and the float, and is advantageous of simple structure, low cost, high reliability, and high stability. Also, the composite hydrological monitoring system can exhibit high survivability hour and ensure flood safety during severe floods.

Although the present invention has been explained in relation to its preferred embodiment, it is to be understood that many other possible modifications and variations can be made without departing from the spirit and scope of the invention as hereinafter claimed.

What is claimed is:

1. A composite hydrological monitoring system, comprising:
    a first hollow base body including a first accommodating space, wherein a plurality of firth through holes is disposed on a sidewall of the first hollow based body and interconnects to the first accommodating space;
    a second hollow base being body disposed in the first accommodating space and includes a second accommodating space, wherein a plurality of second through holes is disposed on a sidewall of the second hollow base body and interconnects to the first accommodating space and the second accommodating space;
    a counterweight component being housed in the second accommodating space of the second hollow base body, wherein the counterweight component is capable of moving in a vertical direction under gravity;
    a test component being capable of moving in the vertical direction along with the counterweight component and presenting a change in mechanical energy;
    a strip connecting with the counterweight component and the test component, the test component is driven by the strip to present the change in mechanical energy when the counterweight component moves upwards in the vertical direction;
    a first sensor detecting the change in mechanical energy to generate a first signal;
    a float being movably sleeved on the strip;
    a second sensor including a plurality of sensing elements, which are disposed at a predetermined interval from one another in the vertical direction, wherein the float triggers the sensing element at a corresponding position and drive the second sensor to generate a second signal; and
    a signal processing unit receiving the first signal and the second signal, wherein the signal processing unit converts the first signal into a scour depth and converts the second signal into at least one of a water level and a flow velocity.

2. The composite hydrological monitoring system as claimed in claim 1, wherein a magnetic element having high magnetic permeability is disposed on a sidewall of the float, wherein the float triggers the sensing element at the corresponding position through the magnetic element.

3. The composite hydrological monitoring system as claimed in claim 2, wherein each of said sensing elements is a magnetic switch or an inductive coil.

4. The composite hydrological monitoring system as claimed in claim 3, wherein said magnetic switches are disposed symmetrically on at least two opposite outer sidewalls of the second hollow base body for forming a plurality of sensing parts and each of said sensing parts includes the magnetic switches that arranged in a row along the vertical direction.

5. The composite hydrological monitoring system as claimed in claim 3, wherein said magnetic switches are connected in parallel on two wires, and when the float triggers the magnetic switch at the corresponding position, the magnetic switch, and the wires together form a conductive loop.

6. The composite hydrological monitoring system as claimed in claim 5, wherein the signal processing unit processes the second signal through phase lock loop method.

7. The composite hydrological monitoring system as claimed in claim 3, wherein the inductive coil surrounds the second hollow base body, the magnetic element of the float will affect the inductive coil and drive the second sensor to generate a second signal when the float passes through the inductive coil.

8. The composite hydrological monitoring system as claimed in claim 7, wherein the inductive coil produces inductance change due to the effect of the magnetic element of the float when the float passes through the inductive coil.

9. The composite hydrological monitoring system as claimed in claim 1, further comprising: a third sensor being disposed at the counterweight component for detecting a movement of the counterweight component and generate a third signal, wherein the signal processing unit converts the third signal into a reference value which relates to at least one of the scour depth, the water level, and the flow velocity.

10. The composite hydrological monitoring system as claimed in claim 1, wherein the change in mechanical energy is a rotation change of the of the test component and the first sensor is utilized to detect the rotation change of the test component.

11. The composite hydrological monitoring system as claimed in claim 10, wherein the test component rotates with respect to a central axis and the strip surrounds the test component along the central axis, and when the counterweight moves downwardly, the strip is elongated by the tensile strength of the counterweight component and drives the test component to rotate.

12. The composite hydrological monitoring system as claimed in claim 11, wherein when a length of the strip is longer than a moving amount of the counterweight component, which moves downwardly, the test component rotates reversely by a retrieving elastic force so that the strip is rewound to a tension state.

13. The composite hydrological monitoring system as claimed in claim 12, wherein the test component includes a shell body, a mechanical turntable, a volute spring, and a three-jaw introversion mechanical coupling assembly, wherein the mechanical turntable is sleeved to an axis of the shell body, the volute spring surrounds the axis and is disposed at an inner wall of the mechanical turntable; the strip surrounds an outer wall of the mechanical turntable; and the three-jaw introversion mechanical coupling assembly connects to the mechanical turntable and the first sensor.

14. The composite hydrological monitoring system as claimed in claim 13, wherein the first sensor is a rotary encoder, which rotates synchronously with the test component.

15. The composite hydrological monitoring system as claimed in claim 1, wherein the signal processing unit comprises an analysis module, which meta-analyses the scour depth and the water level and to raise a warning signal.

16. The composite hydrological monitoring system as claimed in claim 15, wherein the analysis module reads the scour depth and the water level for making a comprehensive analysis,
(1) when the scour depth is larger than a first alert threshold, the analysis module will raise the warning signal, on the contrary, when the scour depth is smaller than the first alert threshold, the analysis module will not raise the warning signal;
(2) when the water level is larger than a second alert threshold, the analysis module will raise the warning, signal, on the contrary, when the water level is smaller than the second alert threshold, the analysis module will not raise the warning signal; and
(3) when the scour depth is smaller than the first alert threshold and the water level is smaller than the second alert threshold but a total value of the scour depth and the water level is larger than a third alert threshold, the analysis module will raise the warning signal, on the contrary, when the scour depth is smaller than the first alert threshold and the water level is smaller than the second alert threshold and the total value of the scour depth and the water level is also smaller than the third alert threshold, the analysis module will not raise the warning signal, wherein the first alert threshold, the second alert threshold, and the third alert threshold are a set parameter respectively.

17. A composite hydrological monitoring system, comprising:
a first hollow base body including a first accommodating space wherein a plurality of first through holes is disposed on a sidewall of the first hollow base body and interconnects to the first accommodating space;
a counterweight component being housed in the first accommodating space of the first hollow base body, wherein the counterweight component is capable is moving in a vertical direction under gravity;
a test component being capable of moving in the vertical direction along with the counterweight component and presenting a change in mechanical energy;
a strip connecting with the counterweight component and the test component, the test component is driven by the strip to present the change in mechanical energy when the counterweight component moves upwards in the vertical direction;
a first sensor detecting the change in mechanical energy to generate a first signal;
a second sensor including a plurality of sensing elements, which are disposed at a predetermined interval from one another in the vertical direction, wherein said sensing elements detect an environmental condition of the corresponding position to generate a second signal; and
a signal processing unit receiving the first signal and the second signal, wherein the signal processing unit converts the first signal into a scour depth and converts the second signal into at least one of a water level and a flow velocity.

18. The composite hydrological monitoring system as claimed in claim 17, wherein said sensing elements are disposed on the strip.

19. The composite hydrological monitoring system as claimed in claim 17, wherein said sensing elements are thermometer or manometer.

20. The composite hydrological monitoring system as claimed in claim 17, further comprising: a third sensor being disposed at the counterweight component for detecting a movement of the counterweight component and generate a third signal, wherein the signal processing unit converts the third signal into a reference value which relates to at least one of the scour depth, the water level, and the flow velocity.

21. The composite hydrological monitoring system as claimed in claim 17, wherein the change in mechanical energy is a rotation change of the test component and the first sensor is utilized to detect the rotation change of the test component.

22. The composite hydrological monitoring system as claimed in claim 21, wherein the test component rotates with respect to a central axis and the strip surrounds the test component along the central axis, and when the counterweight moves downwardly, the strip is elongated by the tensile strength of the counterweight component and drives the test component to rotate.

23. The composite hydrological monitoring system as claimed in claim 22, wherein when a length of the strip is longer than a moving amount of the counterweight component, which moves downwardly, the test component rotates reversely by a retrieving elastic force to that the strip is rewound to a tension state.

24. The composite hydrological monitoring system as claimed in claim 23, wherein the test component includes a shell body, a mechanical turntable, a volute spring, and a three-jaw introversion mechanical coupling assembly, wherein the mechanical turntable is sleeved to an axis of the shell body, the volute spring surround the axis and is disposed at an inner wall of the mechanical turntable; the strip surrounds an outer wall of the mechanical turntable; and the three-jaw introversion mechanical coupling assembly connects to the mechanical turntable and the first sensor.

25. The composite hydrological monitoring system as claimed in claim 24, wherein the first sensor is a rotary encoder, which rotates synchronously with the test component.

* * * * *